No. 853,132. PATENTED MAY 7, 1907.
L. E. SMITH.
MOTOR VEHICLE.
APPLICATION FILED JUNE 16, 1906.
2 SHEETS—SHEET 1.
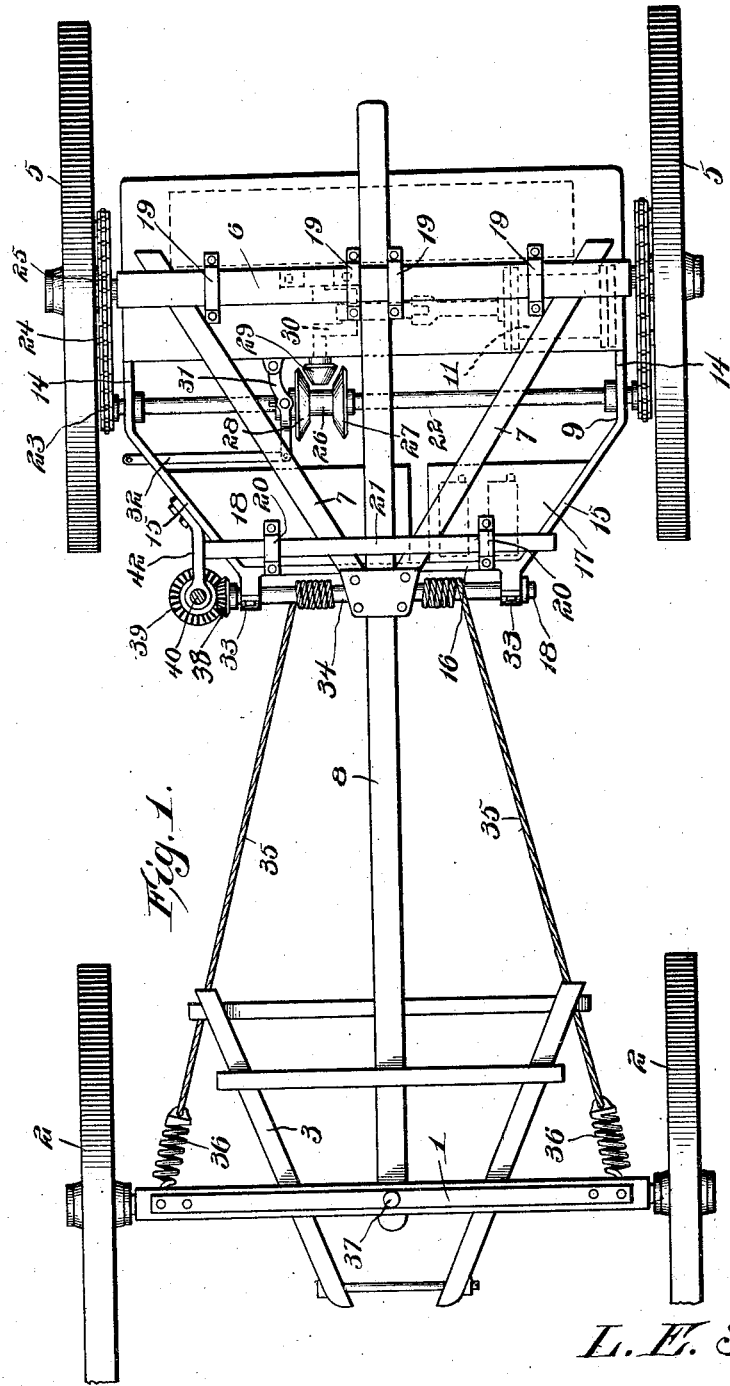

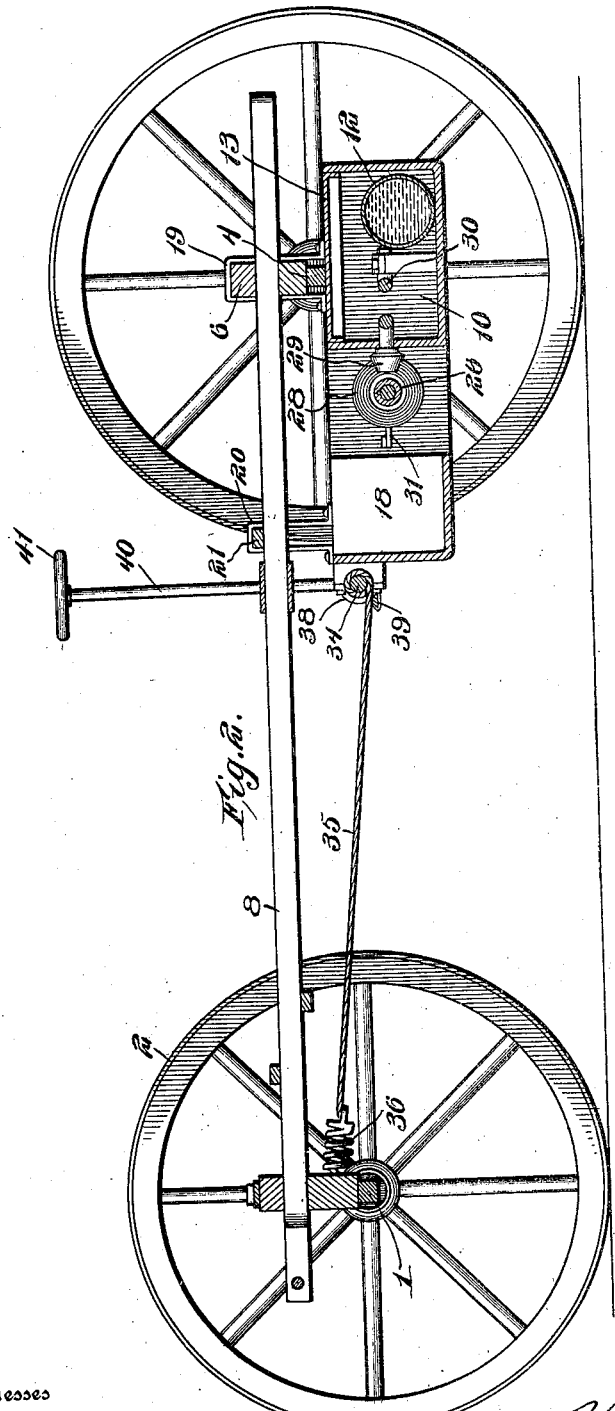

UNITED STATES PATENT OFFICE.

LAFAYETTE E. SMITH, OF HALSEY, OREGON.

MOTOR-VEHICLE.

No. 853,132.  Specification of Letters Patent.  Patented May 7, 1907.

Application filed June 16, 1906. Serial No. 322,047.

*To all whom it may concern:*

Be it known that I, LAFAYETTE E. SMITH, a citizen of the United States of America, residing at Halsey, in the county of Linn and State of Oregon, have invented new and useful Improvements in Motor-Vehicles, of which the following is a specification.

My invention relates generally to improvements in motor vehicles and particularly to a motor drive gearing for wagons, trucks and like vehicles.

The main object of the invention is to provide a simple construction of motor mechanism which may be readily applied to any ordinary construction of wagon to convert the same into a motor vehicle and which may be as readily removed for repairs or the substitution of new for damaged parts when occasion requires.

Another object is to provide a novel and improved construction of steering gear for use in association with the driving mechanism.

With the above and other objects in view, the invention consists of the novel construction and combination of parts hereinafter fully described and claimed, reference being had to the accompanying drawings, in which:—

Figure 1 is a top plan view of the running gear of a wagon or similar vehicle equipped with my invention. Fig. 2 is a vertical longitudinal section through the same.

Referring to the drawings, wherein I have shown the application of the invention to the running gear of a wagon of conventional type, the numeral 1 designates the front axle, 2 the front supporting wheels carried thereby, 3 the front hounds, 4 the rear axle, 5 the rear wheels mounted thereon, 6 the rear bolster, 7 the rear hounds, and 8 the reach. The motor drive gearing or attachment embodying my invention comprises a supporting frame 9, which is of proper width to extend between the rear wheels 5 and be supported from the rear axle and bolster, and also of sufficient length to extend forwardly to effectually support the operating parts. As shown, the frame preferably comprises a casting formed to provide a rear inclosing chamber or compartment 10, adapted to receive a hydro-carbon motor 11 and a tank or reservoir 12 containing the hydro-carbon fuel. This chamber 10 may be closed by a removable cover 13 secured in any preferred manner thereto. In advance of the compartment 10 the frame is provided with short forwardly extending arms 14 having angularly arranged or converging forward extensions 15 connected at their front ends by a transverse piece 16. Formed on or secured to the portions 15 and 16 are chambers or compartments 17 and 18, the former being designed to receive the sparking batteries 18 and the latter to serve as a storage compartment or tank for the cooling water. I have not deemed it necessary to show the sparking connections, any detailed construction of motor, the water circulating connections or the devices for controlling the operation of the motor, as these form no part of my present invention and may be of the ordinary or any preferred construction.

It will be observed that the frame is of such form as to fit between the rear wheels and below the rear axle and rear hounds, and any preferred means may be provided to support it in position. In the present instance I have shown the rear portion of the apparatus supported from the rear axle and bolster by hangers or clips 19, and the front portion supported from the hounds 7 by suspending hangers 20 and a clamping bar 21. The bar 21 rests upon the upper surface of the hounds 7 and passes through the hangers 20 which are of looped form, thereby supporting the attachment firmly in position upon the running gear.

The arms 14 are provided with bearings for a transverse power shaft 22 which is provided at its ends with sprocket pinions 23 which are connected by chains 24 with sprocket drive gears 25, clamped or otherwise fixed to the hubs or spokes of the wheels 5. The sprockets 25 are designed in practice to be of such construction as to permit them to be fixed to the spokes or hubs of wheels of different sizes and of any ordinary construction. On the shaft 22 is arranged a sleeve 26, which is suitably applied thereto to rotate therewith and slide to a limited extent thereon. This sleeve carries a pair of friction gears 27 and 28 adapted to be engaged by an intermediate cone friction gear 29 arranged upon a crank shaft 30 connected with the piston of the motor and driven thereby. The sleeve 26 has at one end an annularly grooved extension suitably engaged by a shifting lever 31 pivoted to the frame 9, and connected with an operating rod 32, designed to be attached in practice to a suitable operating device leading upward in convenient position to be actuated by the driver or operator. By shifting this rod 32 back and forth the sleeve 26 will be moved longitudinally on the power shaft through the medium of the lever 31 to throw either the gear 27 or the gear 28 into engagement with the driving gear or to throw both of said gears 27 and 28 out of engagement with said gear 29. By this means the gearing may be adjusted to run the vehicle forward or backward or to stop the motion of the same, as will be readily understood.

The front cross or connecting piece 16 of the frame is provided with bearings 33 in which is journaled a winding shaft 34. Connected at one end with said shaft are cables 35, the forward ends of which are connected by yielding sections or springs 36 with the front axle 1 on opposite sides of the king bolt 37 on which said axle is mounted for pivotal movement. The rear ends of the cables are preferably wound in a suitable number of windings about the shaft 34, in reverse directions, so that upon turning the shaft forwardly or rearwardly the front axle may be swung to the right or left to effect the steering of the vehicle. The springs or yielding sections 36 are provided to take up any jolts or jars or irregular motion of the front axle from the passage of the front wheels over obstructions or irregularities of surface, and thus to prevent strain from falling upon the shaft 34 and frame of the motor. One end of the shaft 34 carries a beveled pinion 38 meshing with a beveled gear 39 mounted upon the lower end of a steering rod or post 40 having at its upper end a hand wheel or operating device 41 by which said post may be turned to rotate the shaft 34, through said gearing, in either direction to steer the vehicle. Suitable ratchet or other locking mechanism may be employed in practice to lock the steering post in adjusted position, if desired or found necessary. As shown in the present instance, the post 40 is journaled at its lower end in a bracket arm 42 fixed to the adjacent piece 15 and may be suitably stayed or journaled at its upper end upon the vehicle body.

It will be seen from the foregoing description, taken in connection with the drawings, that my invention provides a motor drive gearing which may be applied to any ordinary form of wagon or similar vehicle to drive said vehicle by power, thus converting the same into a motor vehicle, and it will be apparent that the construction is also such as to enable the gearing to be removed at will when its use is no further desired or repairs or the replacement of new for old parts is necessary. It will also be seen that the invention provides a simple and effective steering gear for use in conjunction with the motor mechanism and which is also readily applicable to any vehicle of the type made.

Having thus described the invention, what is claimed as new, is:—

1. In combination with the rear hounds and axle of the running gear of a vehicle, a frame independent of the running gear and arranged below the hounds and axle, hangers supporting the frame from the rear axle, fastenings securing the frame to the hounds, a motor carried by said frame, and driving gearing driven by said motor and in gear with the rear wheels of the vehicle.

2. In combination with the running gear of a vehicle, a frame independent of and arranged below the rear hounds and rear axle, hangers supporting the rear portion of the frame from the rear axle, means including a clamping bar resting upon the hounds and supporting the front portion of the frame, a motor on said frame, and gearing actuated by said motor for driving the rear wheels.

3. In combination with the running gear of a vehicle, a frame independent of and detachably supported upon the rear axle and hounds thereof, a motor carried by said frame, a power shaft on the frame, gearing between the motor and shaft for driving said shaft in either direction, and gearing between said shaft and the rear wheel of the vehicle.

4. In combination with the running gear of a vehicle, a frame independent of said running gear and arranged below the rear axle and rear hounds thereof, means detachably supporting said frame from said axle and hounds, a motor mounted upon the frame, a power shaft journaled on the frame, reversible gearing for driving the shaft from the motor, and gearing between the ends of the shaft and the respective rear wheels of the vehicle.

In testimony whereof, I affix my signature in presence of two witnesses.

LAFAYETTE E. SMITH

Witnesses:
  OWEN BOND,
  FRED BOND.